United States

Venema et al.

[15] 3,651,454
[45] Mar. 21, 1972

[54] AUTOMOTIVE MULTIPLEX SYSTEM

[72] Inventors: Harry J. Venema, Wheat; Kenneth W. Padgitt, Arlington Heights, both of Ill.

[73] Assignee: Borg-Warner Corporation, Chicago, Ill.

[22] Filed: Dec. 15, 1969

[21] Appl. No.: 885,384

[52] U.S. Cl.................................340/52 F, 307/10, 340/184, 340/201
[51] Int. Cl........................................G08c 15/12
[58] Field of Search......................340/52, 27, 179, 180, 181, 340/182, 183, 184, 185, 201, 203; 307/10

[56] References Cited

UNITED STATES PATENTS

| | | | |
|---|---|---|---|
| 3,281,808 | 10/1966 | Church et al. | 340/183 |
| 2,288,683 | 7/1942 | Clancy | 340/52 F X |
| 3,074,065 | 1/1963 | Orgill | 340/52 F X |
| 3,512,405 | 5/1970 | Schlicher | 340/415 X |
| 3,541,550 | 11/1970 | Hamre | 340/52 F X |

*Primary Examiner*—Alvin H. Waring
*Attorney*—Donald W. Banner, William S. McCurry and John W. Butcher

[57] ABSTRACT

A multiplex system for controlling and sensing various component parts such as head lights, engine temperature, fuel level, and turn signal lights is disclosed. The system employs a single two-wire cable to communicate both power and signals between such components and a central control and metering console which may be the instrument dash console. Time multiplex is employed using a reverse polarity for clock pulses from that of the information pulses. Both analog and digital data may be accommodated by using pulse-width modulation as well as bi-level modulation. Receiving units employ a N delay one-shot triggered by the clock pulse and an AND circuit driven by the output of the N delay one-shot and the signal present on the single signal wire, to drive a one-shot which controls a switching device. Similar circuitry is employed for the digital transmitting and the analog transmitter and receiver. A socket input unit for tapping into the single cable in parallel to other input units by employing a piercing plug is disclosed.

7 Claims, 9 Drawing Figures

Inventors
Harry J. Venema
Kenneth W. Padgitt
By Richard G. Kinney
Attorney

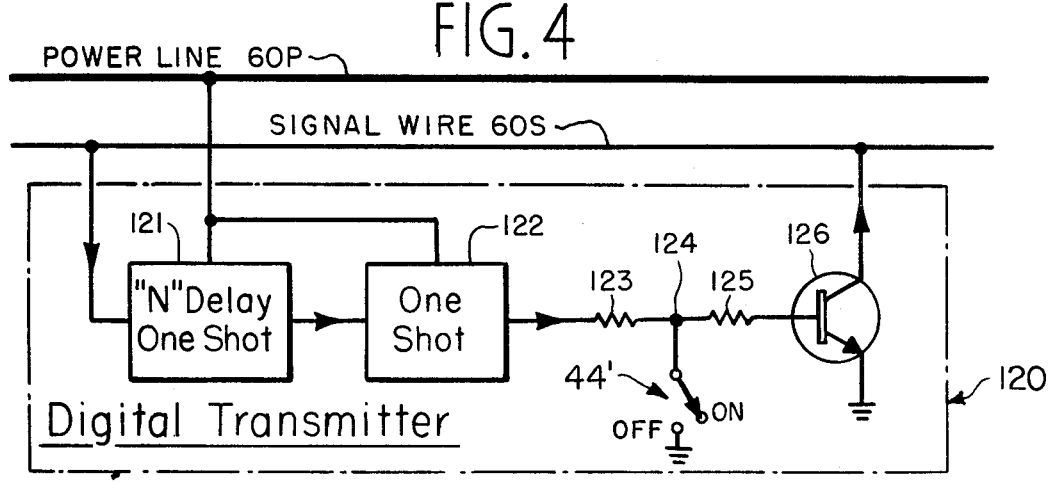
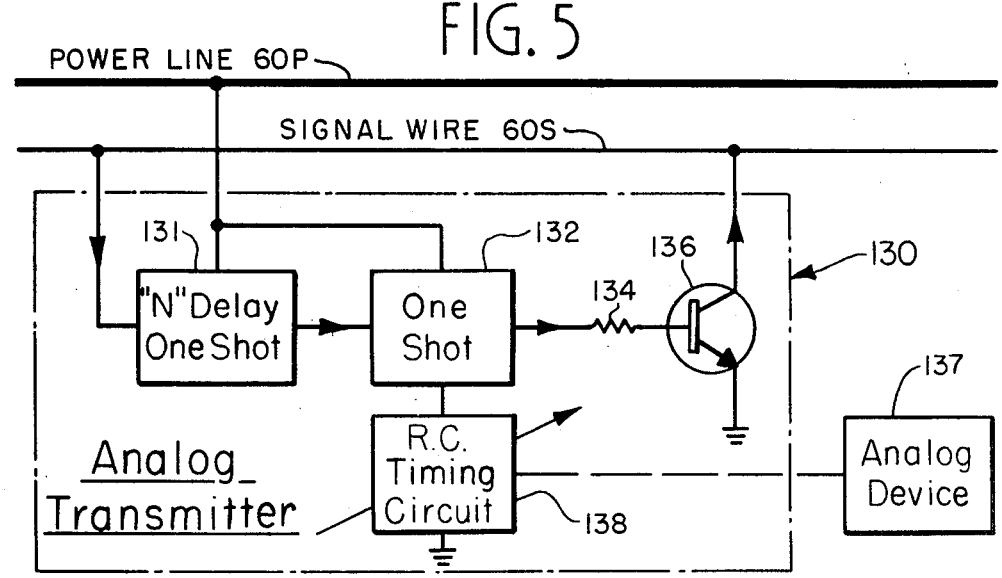
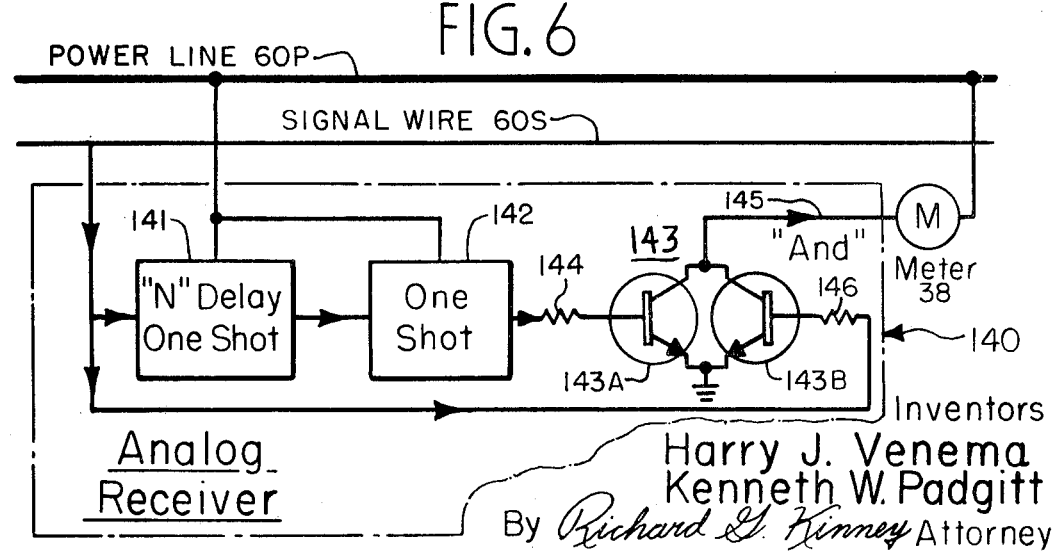

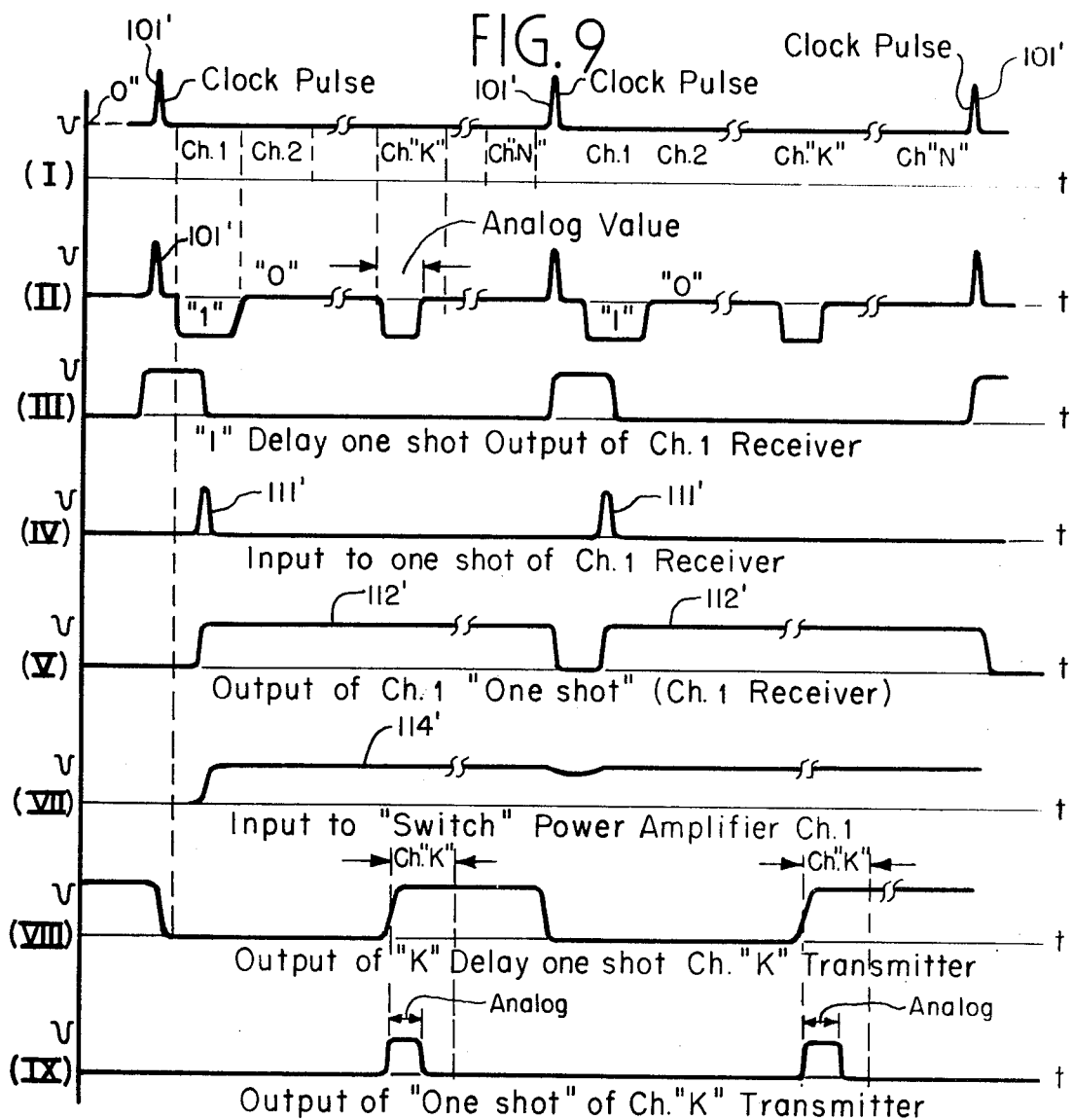
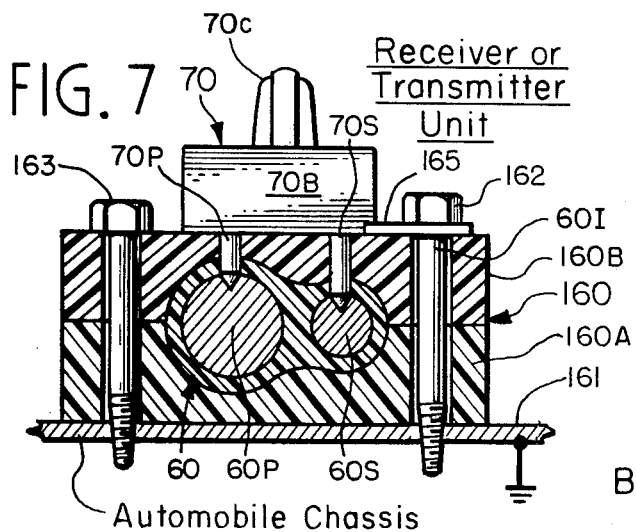
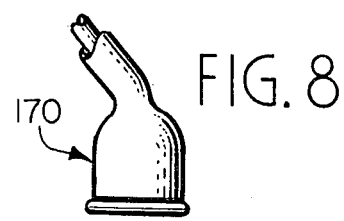

3,651,454

AUTOMOTIVE MULTIPLEX SYSTEM

The present invention relates to an vehicle control and sensing system. It particularly relates to a system for communicating controlled and sensed condition signals within an automobile or similar vehicle.

BACKGROUND OF THE INVENTION

The present invention relates generally to the control and sensing function in a conventional automobile or similar vehicle. In such vehicles it is now the common practice to communicate the control panel or console which is usually situated on the dash of the car to the various components such as the head lamps, turn signals, back-up signals, fuel tank level indicator, parking lights, engine temperature transducer, engine oil pressure transducer, air conditioning equipment, heating equipment, etc., each by a single wire. In some cases two or more components such as the front head lights may be controlled by one wire. However, the complexity of the wiring system of the modern automobile as well as the wiring complexity of similar vehicles has generated a virtual "can of worms" behind the control panel and through portions of the body. Multicolored wires of numerous shades and hue are employed extensively. A number of separate wiring harnesses are required which harnesses, once installed, are often not removable except by disassembly of the automobile. Different color codes and different connectors are required to interconnect the various components and accessories with the wiring harnesses, to interconnect the wiring harnesses with another, and to interconnect the wiring harnesses with the control dash panel.

The assembly of such components during manufacture is consequently a time consuming and expensive proposition. Numerous different component parts must be inventoried and maintained. Special provision against errors in connection and assembly must be taken, such as providing mechanically incompatible coupling members to prevent erroneous coupling.

In servicing this complex system of wires numerous additional problems are encountered. Because the wiring harnesses are virtually irremovable except by disassembly of the automobile, an internal break or grounding of a wire requires the running of an additional wire to entirely bypass the harness. In many cases there is insufficient room to effectively do this and make-shift repairs must be attempted. The time spent in attempting to determine a fault is excessive and the time spent in repairing the fault is also necessarily excessive because it often involves a splicing and running of these additional wires.

SUMMARY OF THE INVENTION

In these and other difficulties, the present inventors have provided an vehicle multiplex system for communicating control and power between components (such as dash switches and lamps) and/or for monitoring certain conditions of components and communicating information thereon to other components (such as between fuel level sensors and indicating meters), which comprises a cable traveling about the vehicle and having a separate power conductor and signal conductor and a DC power source connected to the power conductor. A clock signal source is also provided coupled to the signal conductor. A plurality of transmitters having delay means responsive only to the clock signal for transmitting in definite time channels determined by their delay and a plurality of receivers having delay means responsive only to the clock signal for receiving in only one of the definite channels their delay means, are coupled to the cable so that transmitters and receivers may control and activate different vehicle components provided for receiving the associated signal from the corresponding unit.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 4 is a circuit diagram, partially in block form, of another portion of the system of FIGS. 1 and 2: a digital transmitter unit;

FIG. 5 is a circuit diagram of another part of the system of FIGS. 1 and 2, primarily an analog transmitter unit;

FIG. 6 is similarly a circuit diagram partially in block form of yet another general type of component part of the system of FIGS. 1 and 2, an analog receiver unit;

FIG. 7 is a sectional view of a deferred method of connecting the individual units such as the units depicted in FIGS. 4–6 into the cable employed in the system of FIGS. 1 and 2;

FIG. 8 is a plug-in unit for fitting on top of a portion of the unit depicted in FIG. 7 to connect that unit to the controlled or sensing component or accessory of the automobile of FIG. 1; and FIG. 9 is a plurality of voltage versus time graphs illustrating the voltage output at various points in the system of FIGS. 1–8 which are useful in illustrating the operation of the system.

DETAILED DESCRIPTION

Figure 1:
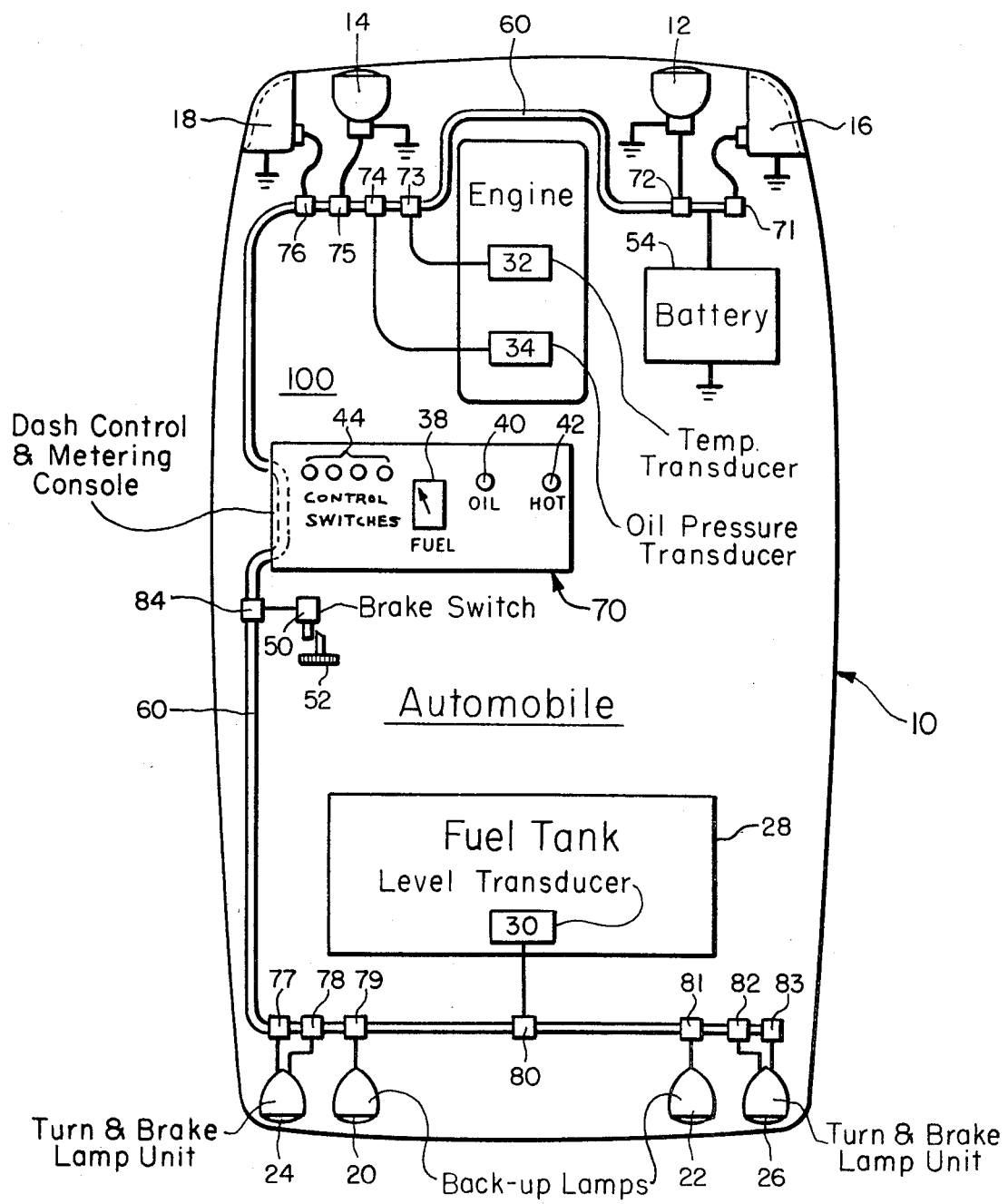
FIG. 1 is a plan view, in skeleton form, of an automobile incorporating a vehicle multiplex system of the present invention.

Referring to FIG. 1 there is depicted an automobile generally designated 10 which includes a plurality of components such as the right head light 12, left head light 14, right turn signal lamp 16, left turn signal 18, left and right back-up lights 20 and 22, and rear left and right brake lights 24 and 26. As is conventional, the automobile 10 includes a fuel tank 28 which has a transducer 30 which produces a signal which is proportionate to height of fuel in the tank. As is also conventional, the automobile includes an engine temperature transducer 32 and an engine oil pressure transducer 34 for respectively producing signals representative of an excessively high engine temperature and excessively low oil pressure.

As is further the conventional practice, the dash of the automobile 10 is provided with a fuel level indicator or meter 38, an oil low pressure indicating light 40, and an over-temperature indicating light 42. The control panel further includes a plurality of control switches 44 which are for the control of the head lights, turn signal lights, back-up lights, etc. In the case of the back-up lights as in other components, the switch may be operated by some other instrumentality other than direct communication by the operator of the motor vehicle. Also included are brake switch 50. The brake switch 50 is conventionally located in association with the brake 52 for operation thereby, rather than being placed directly on the dash.

The automobile 10 also conventionally includes a battery 54, which in most of the United States and Canadian cars has its negative terminal connected to the automobile chassis. Herein we will therefore take the negative potential as ground or reference potential level as is conventional in such cars. It should be understood, of course, that ground as used herein is not necessarily earth potential.

As mentioned before, the switches 44, 50, and the corresponding control of the components of the automobile 10 are normally interconnected by a plurality of wires so as to complete, when desired, circuits from the battery 54 through the component. Similarly the transducer elements such as the elements 30, 32, 34 each are conventionally connected by individual wires to the corresponding indicators 38, 40, and 42 and also to the battery 54 to complete a circuit therewith and give an indicating reading.

Numerous additional components such as air conditioning, interior lamps, rear running lamps, windsheild wippers, etc., may be included but the above mentioned components are sufficient to illustrate the present invention and it would unduely complicate this description to add these. It should be understood that they can be included herein and controlled and monitored in the same manner.

In accordance with the present invention, however, instead of these wires, a single cable 60 is positioned about the automobile 10 and connected via the line 62 to the battery 54. The line 60 may consist of a single conductor but is preferably formed of two conductors, as detailed below in conjunction with the FIG. 7. The cable 60 may make a complete loop about the automobile so as to enclose in upon itself a circle or may have several branches extending out from itself.

A plurality of communication units, designated 71–84, are connected into the cable 60. The unit 71 functions as a receiver to control the communication of power to the right turn lamp 16. The unit 72 similarly functions as a receiver to control the communication of power to the head lamp 12. The unit 73 functions as a transmitter and is coupled to the temperature transducer 32 to transmit a signal on the cable 60 to an associated unit forming part of the control and metering console generally designated 70. This particular receiving unit functions to control the lighting of the lamp 42.

Similarly the communications unit 74 is coupled to the oil pressure transducer 34 to transmit a signal indicating low pressure situations and to control a receiving unit in the console 70 which in turn operates the indicating lamp 40. The communications unit 75 functions as a receiver to selectively communicate power to the head lamp 14 in response to a transmitter in the console 70.

The communications units 76, 77, 78, 79, 81, 82 and 83 correspondingly function as receivers to control respectively the front left turn lamp, the rear left turn lamp portion of the unit 24, the rear left brake lamp portion of the unit 24, the back-up lamps 20 and 22, the turn and brake lamp portion of the lamp unit 26. The communication unit 84 and 80 are sending units which respectively communicate closure of the brake switch 50 and the level of the level transducer 30 to respectively brake communication units 78, 82, and the receiving unit of the gauge 38.

Figure 2:
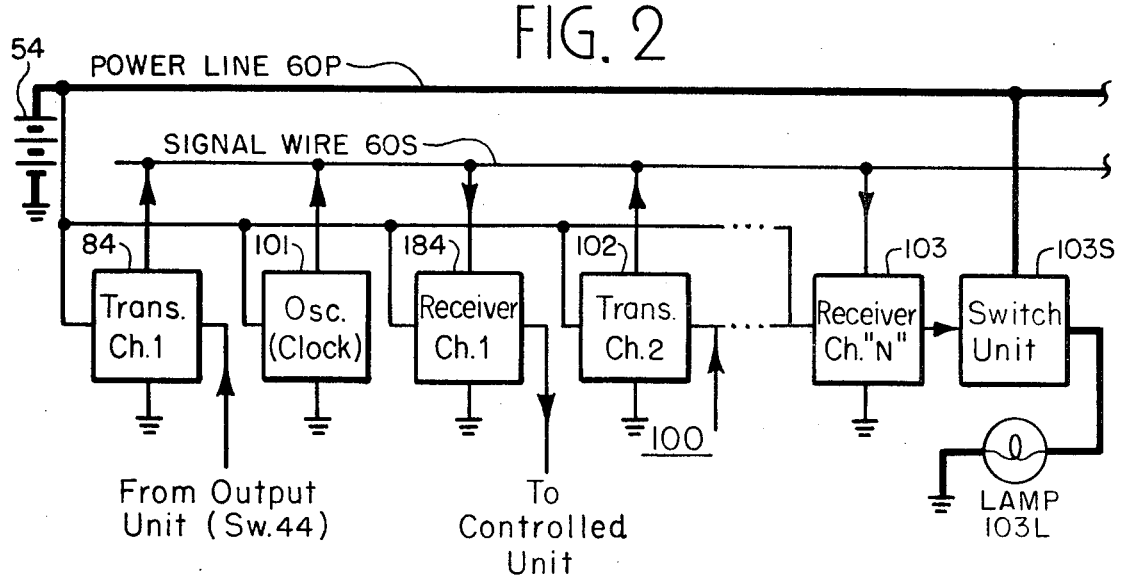
FIG. 2 is a circuit diagram, partially in block diagram form, of the multiplex system employed in the automobile FIG. 1.

Referring to FIG. 2 the multiplexing system, which we will here designate generally by the numeral 100, is depicted. As better seen in this view, the cable 60 comprises a power line 60P which is connected to the positive terminal of the battery 54 and a signal line or wire 60S. The signal wire or line 60S serves as a transmission media between various transmission and receiving communication units. The system 100 includes an oscillator 101 which produces a periodic sharp voltage pulse. These clock voltage pulses of the oscillator 101 are preferably separated by a convenient time period of the order of, for example, 10 milliseconds. The oscillator 101 serves to index or key remaining units of the system 100. A transmitting unit designated 77 which for definiteness may be taken as the unit 84 associated with the brake switch 50 in the automobile of FIG. 1 is designated as occupying the first channel of a time multiplex system. The transmitter 84 as well as the associated receiver 184, the channel 2 transmitter designated 102 in FIG. 2 as well as any of the plurality of additional transmitter and receiving units, such as the receiving unit for channel "N," designated 103, are all keyed by the clock signal from the oscillator 101 via the signal lines 60S.

In FIG. 2 the arrowheads are employed to designate the primary communicating signal functions of the units 77, 177, 102, and 103. Each of the receiving units functions to control a switch unit, such as the unit depicted 103S, to control in turn the component such as the lamp 103L.

As indicated in FIG. 2, any number of channels may be employed for this system 100 depending upon the number of components to be controlled and the conditions to be monitored. Normally, there will be one transmitter per function but there may be more than one receiver tuned to that transmitter's channel. Thus, the receiving units 72 and 75 of the automobile 10 as well as the head light sending unit and corresponding rear running light receiving units (not shown for clarity) would use one channel.

Figure 3:
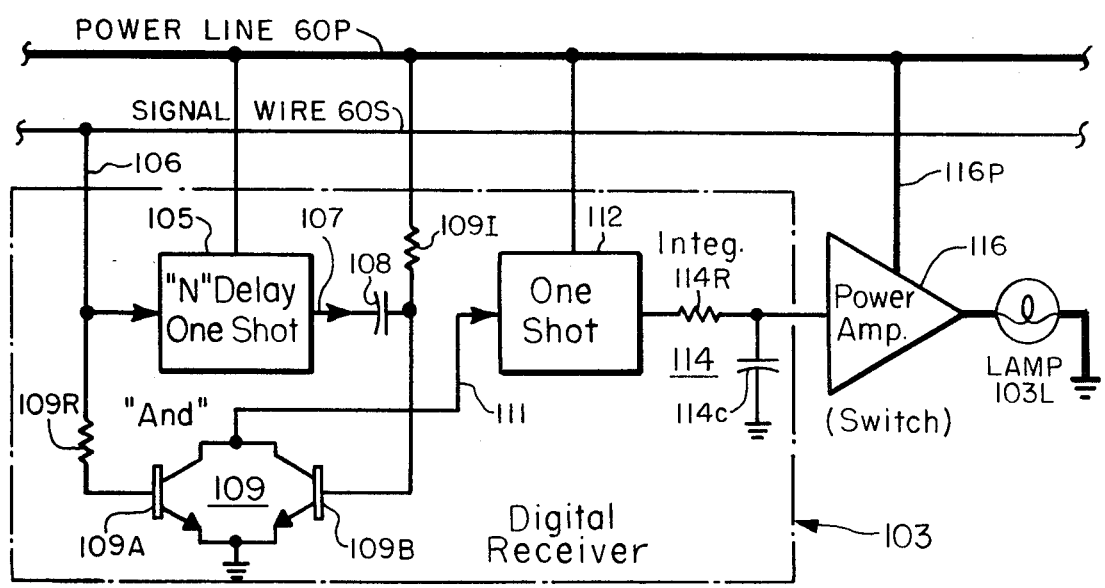
FIG. 3 is a circuit diagram, partially in block form, of a portion of the system of FIGS. 1 and 2 detailing a digital receiver and switching device for operating a component of the automobile in FIG. 1.

One type of receiving unit is depicted in more detail in FIG. 3. Referring to that figure there is seen that this receiver unit is generally designated 103 and includes an "N" delay one-shot 105 which is controlled by an input 106 from the signal wire 50S. The signal output of the end delay one-shot is delayed by "N" number of channel periods and produced on the output line 107. This output signal is coupled to the capacitor 108 to an AND circuit generally designated 109. The other input to the AND circuit is the signal line 60S, via line 106. The output from the AND circuit is designated 111 and serves as the input to a one-shot 112 which feeds an integration circuit generally designated 114 whose output is connected through a switching unit such as the power amplifier 116. The power amplifier serves to couple the power from the power line 60P via the line 116 to the component such as a lamp 103L and thus to ground. The AND circuit 109 is preferably comprised of a pair of transistors 109A and 109B whose emitters are connected in common to ground and whose collectors are connected in common to line 111. The base of the transistor 109 is preferably connected through a resistor 109R to the input line 106 while the base of the transistor 109B is preferably connected through the capacitor 108 to the end delay one-shot output 107. A resistor 109I is also connected to the base of the transistor 109B and to the voltage B+ line 60P. The integration circuit 114 preferably includes a resistor 114R connected between the output of the one-shot 112 and the full input of the power amplifier 116 and the capacitor 114C connected between the input of the power amplifier 116 and ground.

The digital transmitter for use in the system 100 is depicted in FIG. 4 and generally designated 120. The transmitter 120 also includes a delay one-shot 121 coupled to the signal line 60S for producing an output signal delayed by N−1 delay periods from each clock input pulse. The number "N" may be any integer, one, two, three, etc. The output from the one-shot from the end delay one-shot 121 is fed directly to the one-shot 122 whose output is coupled to resistor 123 to a terminal point 124. Terminal point 124 is connected through a switch which may be the manually operated light switch such as one of the switches 44 (which is here designated 44′) and ground.

The terminal point 124 is also connected through a resistor 125 to the base of a transistor 126 whose emitter is grounded and whose collector is connected to the signal line 60S. When the switch 44 is turned to its "off" position to ground out the terminal point 124, the effects of the delayed one-shot 121 and one-shot 122 output is thus grounded out. When the switch 44′ is turned to its "on" position in which the potential of the terminal point 124 is not grounded, the output of the one-shot 122 biases the base of the transistor 126 in a manner such as to saturate the transistor 126 and thus ground the signal line 60S whenever the output of the one-shot 122 is high.

In FIG. 5 an analog transmitter similar to the digital transmitter of FIG. 4 is depicted. This analog transmitter is designated 130 and includes an "N" delay one-shot 131 (where "N" may be any low integer) for feeding a one-shot 132. The output of the one-shot 132 is also connected through a resistor 134 to the base of an NPN transistor 136. The emitter of the transistor 136 is grounded and its collector is connected to the signal line 60S. In this case an analog device 137 functions to control an "RC" timer circuit 138 which is part of the one-shot 132 and determines the length of time for the output for the one-shot 132. Again when an output signal is produced from the one-shot 132 the transistor 136 is saturated to effectively ground the signal line 60S during that period.

Referring to FIG. 6, a receiver unit 140 for the analog transmitter 130 is depicted. This unit includes again an "N" delay one-shot 141 whose output is connected to a one-shot 142. The one-shot 142 produces a one-shot output signal for a duration equal to the channel with time. The output of the one-shot 142 is coupled to an AND circuit 143 through a resistor 144. The AND circuit 143 preferably consists of a pair of NPN transistors 143A and 143B whose emitters are connected in common to ground and whose collectors are connected in common to an output line 145. The other input to the AND circuit is to the base of the second transistor 143B. This base is connected through a resistor 146 to the signal line 60S. The output line 145 and the AND gate 143 is connected to a meter here designated 38, as was the fuel gauge of FIG. 1. The gauge meter 38 is preferably calibrated to read in whatever analog function is being monitored, such as the fuel level. The other side of the meter 138 is connected to the bias line 60P.

In operation the analog receiver 140 of FIG. 6 produces an output signal from the "N" delay one-shot a period delayed by approximately N−1 channel widths from the clock pulse. Its output triggers the one-shot 142 to produce a signal which is coupled to the AND gate 143. Thus, whatever signal is present on the signal wire 60S during the "N" channel time period is coupled through the AND gate 143 to the meter 38. The meter 38 is of the self-integrating type and integrates these pulses to give a reading proportionate to the width of the pulse communicated during the "N" channel time period.

In FIG. 7 the preferred method of connecting the receiving or transmitting unit, such as the unit designated 70, to cable 60 is depicted. The cable 60 is preferably a two conductor cable with a large conductor 60P serving as the power line and a smaller conductor 60S as the signal line. The conductor 60P and 60S are preferably bound together by insulation 60I formed in a generally figure eight shape about the two separated conductors. In installation, the cable 60 is preferably positioned about the automobile 10 and holding units such as the unit 160 are employed to affix the cable 60 to the car body or automobile chassis, here represented by a layer of sheet metal 161. The unit 160 preferably comprises a lower member 160A and upper member 160B conformingly sized to one another and the cable 60 together define a figure eight (in cross section) hollow to receive and captivate the cable 60. At least two screws 162 and 163 serve to clamp the upper member 160B against the lower member 160A and to affix the entire unit into the chassis 161. The screw 162 is preferably made of conductive material and a conductive connection member 165 is placed there under to serve to connect the unit 70 to ground.

A plug-in communication unit 70 including a body 70B from which a pair of prongs 70P and 70S for fitting in conformingly sized openings as to the upper part of the member 160B and for piercing the insulation 60I of the cable 60 and entering into and making an electrical contact with the respectively line 60P and 60S is provided. A suitably keyed connection unit 70C may also be provided for receiving an electrically insulated coupling connector 170 depicted in FIG. 8.

OPERATION

Referring to FIG. 9, the operation of the system 100 will now be taken up in more detail. Graph I represents a typical output signal from the clock oscillator 101. This signal has periodic plus pulses 101' separated by a period of time, such as 10 milliseconds, which time period is further subdivided to a number of time channels designated channel 1, channel 2, etc. These include a general channel K and a final channel N. The clock pulse may be, for example, +12 volts. A nominal output, here designated by the logical "0," of between 4 and 6 volts is established for the system. The ground line is taken as logical "1."

This system has the advantage of separating the clock pulses from the information by polarity from the reference or "0" line.

In Graph II a typical output on signal line 60S is depicted for the case when information is being transmitted. In this graph the X-axis is placed at the "0" output voltage level. As can there be seen, the first channel has a "1" signal on it and the second channel has a "0" signal on it. The channel K is here taken to be an analog channel and a pulse occupying only a portion of the time period allotted to channel K is therefore shown. The width of the pulse from the initiation of the channel K to the pulse's end, determines the information being transmitted.

Graph III represents the output from the first channel of a receiver such as the receiver depicted in FIG. 3. In this case "N" is assumed to be one. The delay one-shot's output therefore rises at the clock pulse and continues until a point at the approximate center of channel 1, at that point the voltage again drops to ground level. This output is produced in response to the clock pulses 101.

In Graph IV of FIG. 9 the input to the one-shot 112 is depicted. This input is a result of anding the derivative of the signal depicted in Graph III and the signal present on the signal wire 60S depicted in Graph II. The capacitor 108 serves to shape this pulse into the narrow pulse 111'. The output of the one-shot 112 is depicted in Graph V and comprises a pulse 112' which has a period of approximately, but slightly less than, the periods between the clock pulses 101. The output of the integrating circuit 114 is depicted in Graph VII wherein the short gaps and the pulses 112' are eliminated shown by line 114'. This continuous pulse 114' functions to maintain the power amplifier 116 in its "on" position until the signal level of the first channel changes back to "0." Very soon thereafter the pulse output 112' will cease and the output 114' will drop back to zero to turn off the power amplifier 116 and de-energize the component (extinguish the lamp 103L in the example of FIG. 3).

The digital transmitter 120 in FIG. 4 functions to produce a "1" signal in the first channel, for example, as depicted in Graph II in a similar manner. In this case the output from the n delay one-shot 121 occurs very shortly after this pulse 101 and thus which turn triggers the timed one-shot 122. The one-shot 122 is timed so as to produce an output for exactly one channel width. In this case, if the switch 44' is turned to its "on" position this one channel "1" output saturates the transistor 126 to effectively drop the line 60S to ground potential through the emitter collector circuit of the transistor 126 for this period and to produce the "1" signal depicted for channel 1.

The analog transmitter 130 of FIG. 5 functions in a similar manner to the transmitter 120 of FIg. 4, except for the fact that the output pulse of the one-shot 132 is variable by the setting of the timing circuit 138 as set by the device 137. Thus, the Graph VIII the delay one-shot output 131' institutes the pulse outputs 136' of Graph IX but these are foreshortened by the setting of the analog unit 137.

The delay one-shots and one-shots are well-known units. It is the preferred manner of practicing the invention that the circuit of the communication units such as the units of FIGS. 3–6 be made using integrated circuit techniques and that the controlled switch (such as the amplifier 116 of FIG. 3) or other components be made in a similar manner preferably as part of the same structure as the communication unit. In this manner, the small plug-in type unit 70 may be achieved. It is contemplated that for some components the self integrating feature (as of the meter 38 in FIG. 6) may be employed to eliminate integration circuits (such as the circuit 114 of FIG. 3).

Also, as depicted in FIG. 4, it is a feature and advantage of the present invention that the transmitter and its controlling or keying switch 44' may be made in a unitary package.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A vehicle multiplex system for communicating control and power to vehicle components and/or for monitoring certain conditions of vehicle components, comprising:

a two conductor cable traveling about the vehicle and having a power conductor for carrying DC power and a signal conductor;

a clock pulse source coupled to said signal conductor;

a plurality of transmitters for transmitting in definite time channels defined in relation to the pulses of said clock pulse source, coupled to said signal conductor, and each controlled to produce a signal in response to a condition of the vehicle;

a plurality of receivers also coupled to said signal conductor, at different locations thereof, each for receiving signals in one of the definite channels, and associated with a component of the vehicle for controlling its condition.

2. The system defined in claim 1 wherein one of said plurality of receivers comprises:

a delay one-shot response to the clock pulses to produce an output signal which is time delayed therefrom by an amount of time: $a + Nt$, wherein "$a$" is a constant and "N" is a positive whole integer and "$t$" is the time allocated for one channel, an AND gate coupled to said signal line and said delay one-shot to produce an output signal which is coupled to said signal line.

3. The system defined in claim 1 wherein one of said transmitters comprises:

a delay one-shot responsive to the clock pulses to produce an output which is time delayed therefrom by an amount of time: $+Nt$ wherein "N" is Zero or a positive whole integer and "$t$" is the time allocated for one channel, means for coupling said output to selectively produce or not produce a signal on said signal line.

4. The system of claim 1, wherein:

said clock pulse source and said signals are pulses of opposite polarity to one another from a normal-no signal potential level to aid in discrimination therebetween.

5. The system of claim 1, wherein:

at least one of said plurality of transmitters puts out a pulse signal whose width in its assigned time channel is varied in proportion to a sensed monitored condition of a component of the automobile.

6. A vehicle multiplex system for communicating control and power between components such as dash switches and lamps and/or for monitoring certain conditions of components and communicating information thereon to other components, such as between fuel level sensors and indicating meters, comprising:

a conductor cable (60) traveling about the vehicle and having a separate power conductor (60P) and signal conductor (60S);

a DC power source connected to the power conductor;

a clock signal source (101) coupled to said signal conductor for generating a clock signal thereon;

a plurality of transmitters (73, 102) having delay means responsive only to said clock signal for transmitting in different definite time channels defined in relation to the clock signals determined by the delay of said delay means; and a plurality of receivers (75, 103) having delay means responsive only to said clock signal also coupled to said signal conductor for receiving signals from said transmitters in definite time channels determined by the delay of said receiver delay means;

said transmitters and receivers being associated with different vehicle components for respectively activation thereby and control thereof.

7. The invention as defined in claim 6 wherein:

at least one of said plurality of transmitters (130) are coupled to an analog output vehicle component (137) and produces a pulse whose width is modulated in response thereto;

at least one of said plurality of receivers (140) receives signals in the same channel in which said at least one transmitter (130) transmits and has its output coupled to an analog display device (138).

* * * * *

UNITED STATES PATENT OFFICE
CERTIFICATE OF CORRECTION

Patent No. 3,651,454          Dated March 21, 1972

Inventor(s) Harry J. Venema et al

It is certified that error appears in the above-identified patent and that said Letters Patent are hereby corrected as shown below:

On the cover sheet [54] the title should read -- VEHICLE MULTIPLEX SYSTEM --. Column 1, line 51, after "In" insert -- overcoming --. Column 3, line 2, "windsheild" should read -- windshield --.

Signed and sealed this 21st day of November 1972.

(SEAL)
Attest:

EDWARD M. FLETCHER, JR.
Attesting Officer

ROBERT GOTTSCHALK
Commissioner of Patents